(12) United States Patent
Yabe

(10) Patent No.: US 8,310,620 B2
(45) Date of Patent: Nov. 13, 2012

(54) SURFACE LIGHT SOURCE DEVICE WITH FRAME HAVING ADHESIVE ON REFLECTOR AND CIRCUIT BOARD AND LIQUID CRYSTAL DISPLAY DEVICE

(75) Inventor: Mamoru Yabe, Sakado (JP)

(73) Assignee: OMRON Corporation, Kyoto (JP)

( * ) Notice: Subject to any disclaimer, the term of this patent is extended or adjusted under 35 U.S.C. 154(b) by 359 days.

(21) Appl. No.: 12/713,001

(22) Filed: Feb. 25, 2010

(65) Prior Publication Data

US 2011/0058121 A1 Mar. 10, 2011

(30) Foreign Application Priority Data

Sep. 9, 2009 (JP) ................................. 2009-208661

(51) Int. Cl.
*G02F 1/1335* (2006.01)
*F21V 7/04* (2006.01)
(52) U.S. Cl. ................ 349/61; 349/62; 349/64; 349/65; 349/68; 362/615; 362/616; 362/617; 362/631; 362/363
(58) Field of Classification Search .................... 349/58, 349/61–26, 64–65, 67–68; 362/561, 631, 362/633, 634, 616
See application file for complete search history.

(56) References Cited

U.S. PATENT DOCUMENTS 7,292,290 B2 * 11/2007 Miyagawa et al. ............. 349/58
(Continued)

FOREIGN PATENT DOCUMENTS

| JP | 2009-054327 A | 3/2009 |
| KR | 20080019977 A | 3/2008 |
| KR | 20080076064 A | 8/2008 |

OTHER PUBLICATIONS

Korean Office Action issued in Korean Application No. 10-2010-0011387 dated Apr. 28, 2011 and English translation thereof, 13 pages.
English Abstract of KR 20080019977A published on Mar. 5, 2008, 1 page.

(Continued)

*Primary Examiner* — Hoan C Nguyen
(74) *Attorney, Agent, or Firm* — Osha Liang LLP

(57) ABSTRACT

A surface light source device has a reflector plate, a light guide plate placed on an upper surface of the reflector plate, the light guide plate including a light guide plate main body having a light outgoing area, and a light introducing portion provided continuously from an end of the light guide plate main body, the light introducing portion having an upper surface side projected from an upper surface of the light guide plate main body in such a manner as to have a maximum thickness greater than a thickness of the light guide plate main body, a light source disposed such that light emitted therefrom is introduced into the light guide plate from a light incidence surface of the light introducing portion, a frame-like member having a uniform thickness, the frame-like member being adhesively applied to the upper surface of the reflector plate in such a manner as to enclose the light guide plate and the light source, a wiring substrate mounted at a lower surface thereof with the light source, the wiring substrate being adhesively applied to an upper surface of the frame-like member and to the upper surface of the maximum thickness area of the light introducing portion, and at least one optical sheet disposed on the upper surface of the light guide plate main body, the light introducing portion being sandwiched between the wiring substrate adhesively applied to the upper surface of the frame-like member and the reflector plate adhesively applied to the lower surface of the frame-like member.

17 Claims, 9 Drawing Sheets

U.S. PATENT DOCUMENTS

| | | | |
|---|---|---|---|
| 7,359,012 B2 * | 4/2008 | Ishiwa et al. | 349/65 |
| 7,557,451 B2 * | 7/2009 | Shinojima | 257/776 |
| 2008/0002099 A1 * | 1/2008 | Oh | 349/65 |
| 2009/0051851 A1 | 2/2009 | Horiuchi et al. | |

OTHER PUBLICATIONS

English Abstract of KR 20080076064A published on Aug. 20, 2008, 1 page.

* cited by examiner

SURFACE LIGHT SOURCE DEVICE WITH FRAME HAVING ADHESIVE ON REFLECTOR AND CIRCUIT BOARD AND LIQUID CRYSTAL DISPLAY DEVICE

BACKGROUND OF THE INVENTION

1. Technical Field

The present invention relates to surface light source devices and liquid crystal display devices, and more specifically, to surface light source devices for use as backlights for liquid crystal display devices and to the liquid crystal display devices.

2. Related Art

With the reduction in weight and thickness of devices such as mobile phones, the liquid crystal display devices for use in such mobile phones are desired to have lighter weights and reduced thicknesses. The surface light source devices for use as backlights for the liquid crystal display devices are desired to have even more reduced thicknesses accordingly.

An exemplary surface light source device with a reduced thickness is disclosed in JP2009-054327A (a planar light unit). A cross section of a liquid crystal display device using the surface light source device is illustrated in FIG. 1.

In a surface light source device 11 described in JP2009-054327A, a reflector sheet 12, a film-like light guide plate 13, a diffuser sheet 14, and two prism sheets 15a and 15b are set in a frame 16 having a shape similar to a picture frame. The reflector sheet 12 is applied to the lower surface of the frame 16 by means of a reflective sheet tape (not shown), while a rim sheet 17 is applied to the upper surface of the frame 16. Further, the frame 16 is applied to the outer peripheral surfaces of the light guide plate 13 by means of a double-sided tape (not shown). An end portion of the light guide plate 13 projects from edges of, e.g., the reflector sheet 12 and the diffuser sheet 14, and light sources 19 are fitted in openings 18 formed in the end portion. A liquid crystal panel 20 is laid on the surface light source device 11 at a position in opposition to the prism sheet 15b. In this fashion, a liquid crystal display device 21 is configured.

The surface light source device 11 uses a film-like light guide plate 13 and a sheet-like frame 16 that is formed from, e.g., a PET sheet or a SUS sheet punched by a press, thereby achieving reduction in overall thickness of the surface light source device 11.

In the surface light source device 11 of JP2009-054327A, the frame 16 is applied to the outer peripheral surfaces of the light guide plate 13 by means of a double-sided tape, and thereafter the reflector sheet 12 is applied to the lower surface of the frame 16 by means of a reflective sheet tape. The rim sheet 17 with the prism sheet 15b, the prism sheet 15a, and the diffuser sheet 14 applied to the lower surface thereof in order is applied to the upper surface of the frame 16, so as to set the diffuser sheet 14 and the prism sheets 15a and 15b within the frame 16.

Since the light guide plate 13 is merely applied at its outer peripheral surfaces to the frame 16 by using a double-sided tape, the light guide plate 13 is not located heightwise (along the thickness) at a satisfactory level of accuracy relative to the frame 16. For this reason, the light guide plate 13 may tilt within the frame 16, causing inclination from the vertical direction in the direction of the light emitted from the surface light source device.

Also, since the light sources 19 are merely inserted within the openings 18 in the light guide plate 13, the light sources 19 are not fixed sufficiently firmly, resulting in unsatisfactorily accurate locating of the light sources 19 along the thickness of the light guide plate 13.

Further, since the light guide plate 13 is applied at its outer peripheral surfaces to the frame 16 by means of a double-sided tape, the difference in indices of refraction is small at the outer peripheral surfaces of the light guide plate 13. Thus, the light that has been guided through the light guide plate 13 to reach the outer peripheral surfaces leaks out from the outer peripheral surfaces due to the adhesive of the double-sided tape, which makes a loss. This constitutes one of the causal factors in lowering of brightness of the surface light source device.

Generally, even a thin light source (an LED) has a thickness on the order of 400 µm (the height of the light outgoing window is on the order of 300 µm). In case of using a planar, thin light guide plate 13 (125 µm), it is difficult to guide the light emitted from the light sources 19 efficiently into the light guide plate 13. The light use efficiency is thus decreased. Even if a light source that is as thin as the light guide plate 13 exists, such a thin light source presumably gives off light of a small quantity, which leads to insufficient brightness of the surface light source device and may not be suitable for practical use.

SUMMARY

One or more embodiments of the present invention provides a thin surface light source device that enables reliable locating of a light guide plate and a light source along the thickness thereof. One or more embodiments of the present invention provides a thin surface light source device with good light use efficiency.

In accordance with a first aspect of the present invention, a surface light source device includes: a reflector plate; a light guide plate placed on an upper surface of the reflector plate, the light guide plate including a light guide plate main body having a light outgoing area, and a light introducing portion provided continuously from an end of the light guide plate main body, the light introducing portion having an upper surface side projected from an upper surface of the light guide plate main body in such a manner as to have a maximum thickness greater than the thickness of the light guide plate main body; a light source disposed such that light emitted therefrom is introduced into the light guide plate from a light incidence surface of the light introducing portion; a frame-like member having a uniform thickness, the frame-like member being adhesively applied to the upper surface of the reflector plate in such a manner as to enclose the light guide plate and the light source; a wiring substrate mounted at a lower surface thereof with the light source, the wiring substrate being adhesively applied to an upper surface of the frame-like member and to the upper surface of the maximum thickness area of the light introducing portion; and at least one optical sheet disposed on the upper surface of the light guide plate main body. The light introducing portion is sandwiched between the wiring substrate adhesively applied to the upper surface of the frame-like member and the reflector plate adhesively applied to the lower surface of the frame-like member.

In the surface light source device according to the first aspect of the present invention, the light guide plate is sandwiched between the reflector plate adhesively applied to the lower surface of the frame-like member and the wiring substrate adhesively applied to the upper surface of the frame-like member. In addition, the light guide plate is adhesively applied to the wiring substrate. Accordingly, the light guide plate is reliably held and located by means of the wiring substrate and the reflector plate. Since the light source is mounted on the wiring substrate, it is possible to stabilize the positional relationship between the light source and the light guide plate.

Moreover, a light introducing portion with a greater thickness is provided in a portion of the light guide plate, and the light introducing portion is sandwiched between the reflector plate and the wiring substrate. An optical sheet may hence be set on the light guide plate main body with a smaller thickness. Accordingly, the thickness of the surface light source device may be reduced in comparison with the case in which a light guide plate with a uniform, greater thickness is sandwiched between the reflector plate and the wiring substrate.

In the surface light source device according to the first aspect of the invention, the light introducing portion with a maximum thickness greater than the thickness of the light guide plate main body is provided at an end portion of the light guide plate, and the light source is disposed opposite the light incident surface of the light introducing portion. The improvement in light incidence efficiency is achieved with respect to the light that enters the light guide plate from the light source. Moreover, since the outer peripheral surfaces of the light guide plate need not be adhesively attached to the frame-like member, the outer peripheral surfaces of the light guide plate contact the air, and the light to leak from the outer peripheral surfaces of the light guide plate is reduced in quantity. Hence, the light use efficiency of the surface light source device is improved, and the brightness is enhanced in the light outgoing area.

According to a second aspect of the present invention, in the surface light source device, the combined thicknesses of a first adhesive member and of the frame-like member is approximately equal to the maximum thickness of the light introducing portion, the first adhesive member adhesively attaching a lower surface of the frame-like member to the upper surface of the reflector plate. With this surface light source device, the light introducing portion of the light guide plate may be sandwiched snugly between the reflector plate and the wiring substrate.

According to a third aspect of the present invention, in the surface light source device, the combined thicknesses of the first adhesive member, of a second adhesive member, and of the frame-like member are approximately equal to the height of the light source measured from a lower surface of the wiring substrate, the first adhesive member adhesively attaching the lower surface of the frame-like member to the upper surface of the reflector plate, the second adhesive member adhesively attaching the lower surface of the wiring substrate to the upper surface of the frame-like member. With this surface light source device, since the light source is also sandwiched and held between the wiring substrate and the reflector plate, the light source may be located even more reliably.

According to a fourth aspect of the present invention, in the surface light source device, the wiring substrate is disposed at such a position that the wiring substrate does not overlie the light outgoing area of the light guide plate main body and the optical sheet, the thickness of the light guide plate or the total thickness of the optical sheet is decided such that a relationship of $t1-t2 \geqq t3$ is established where $t1$ is the maximum thickness of the light introducing portion, $t2$ is the thickness of the light guide plate main body, and $t3$ is the total thickness of the optical sheet, and a light shielding member is adhesively applied to an upper surface of the wiring substrate and to the upper surface of the frame-like member at an area exposed from the wiring substrate, such that a height difference is formed therebetween.

In the surface light source device, the optical sheet may be contained within the space over the light guide plate main body and does not stick out from the maximum thickness area of the light introducing portion. The optical sheet thus does not project beyond the upper surface of the frame-like member, so that the surface light source device can have a reduced thickness. Since the optical sheet does not project beyond the upper surface of the frame-like member, the optical sheet does not become an obstacle in adhesively applying the light shielding member to the upper surface of the frame-like member at an area exposed from the wiring substrate. The light shielding member is applied to the upper surface and is pressed. By doing so, the light guide plate as a whole is held to the frame-like member, so that the rigidity of the thin surface light source device is increased, enabling easy handling of the surface light source device.

According to a fifth aspect of the present invention, in the surface light source device, the thickness of the light guide plate or the total thickness of the optical sheet is decided such that a relationship of $t1-t2=t3$ is established where $t1$ is the maximum thickness of the light introducing portion, $t2$ is the thickness of the light guide plate main body, and $t3$ is the total thickness of the optical sheet, and the light shielding member is also adhesively applied to an upper surface of an outer peripheral portion of the optical sheet. In this surface light source device, the maximum thickness of the light introducing portion may be set to a smallest possible thickness such that the optical sheet does not project from the frame-like member. Hence, the surface light source device can have an even smaller thickness in this case. Further, since the upper surface of the optical sheet comes approximately to the same level as the upper surface of the frame-like member, the light shielding member may be adhesively applied to the upper surface of the frame-like member as well as to the upper surface of the outer peripheral portion of the optical sheet.

According to a sixth aspect of the present invention, in the surface light source device, the combined thicknesses of a third adhesive member and of the wiring substrate are approximately equal to or smaller than the thickness of a polarizer plate, the third adhesive member adhesively attaching the lower surface of the wiring substrate to the upper surface of the maximum thickness area of the light introducing portion, the polarizer plate being applied to a rear surface of a liquid crystal panel. With this surface light source device, by disposing the polarizer plate applied to the rear surface of the liquid crystal panel at a position in opposition to the light guide plate main body, the wiring substrate portion of the surface light source device may be contained in the portion in the rear surface of the liquid crystal panel, which portion is recessed from the lower surface of the polarizer plate in the absence of the polarizer plate. A liquid crystal display device with a reduced thickness is thus provided.

According to a seventh aspect of the present invention, in the surface light source device, the combined thicknesses of the third adhesive member and of the wiring substrate are approximately equal to or smaller than the thickness of the polarizer plate, the third adhesive member adhesively attaching the lower surface of the wiring substrate to the upper surface of the maximum thickness area of the light introducing portion, the polarizer plate being applied to a rear surface of a liquid crystal panel. With this surface light source device, by disposing the polarizer plate applied to the rear surface of the liquid crystal panel at a position in opposition to the light guide plate main body, the wiring substrate portion of the surface light source device may be contained in the portion in the rear surface of the liquid crystal panel, which portion is recessed from the lower surface of the polarizer plate in the absence of the polarizer plate. A liquid crystal display device with a reduced thickness is thus provided.

According to an eight aspect of the present invention, in the surface light source device, the light incidence surface of the light introducing portion extends for a height approximately equal to the maximum thickness of the light introducing portion, and the third adhesive member that adhesively attaches the lower surface of the wiring substrate to the upper surface of the maximum thickness area of the light introducing portion has a thickness approximately equal to or smaller than the distance from the lower surface of the wiring substrate to an upper edge of a light outgoing window of the light source. With the surface light source device, the outgoing light from the light outgoing window of the light source is prevented from proceeding off from the light incidence surface of the light introducing portion, and lowering in light incidence efficiency from the light source into the light guide plate is thus avoided.

According to a ninth aspect of the present invention, a liquid crystal display device includes a liquid crystal panel unit placed on an upper surface of the surface light source device. The liquid crystal panel unit may be superposed on the upper surface of the surface light source device with a light shielding member interposed therebetween.

The liquid crystal display device of the ninth aspect uses a light source device according to one or more embodiments of the present invention; therefore, in the liquid crystal display device using a thin surface light source device, the light guide plate and the light source of the surface light source device may be reliably held and located. Because of the improved light use efficiency of the surface light source device, a brighter screen is provided to the liquid crystal display device.

According to a tenth aspect of the present invention, a liquid crystal display device includes a liquid crystal panel unit placed on an upper surface of the surface light source device, the liquid crystal panel unit including a liquid crystal panel and a polarizer plate applied to a rear surface of the liquid crystal panel. The polarizer plate is applied to a portion of the rear surface of the liquid crystal panel. The portion of the surface light source device where the wiring substrate is disposed is situated in an area of the rear surface of the liquid crystal panel where the polarizer plate is not present. An upper surface of the wiring substrate is situated above a lower surface of the polarizer plate. The liquid crystal panel unit may be superposed on the upper surface of the surface light source device with a light shielding member interposed therebetween. Since the surface light source device according to one or more embodiments of the present invention is applied to the surface light source device, the polarizer plate applied to the rear surface of the liquid crystal panel may be disposed at a position in opposition to the light guide plate main body. In this manner, the wiring substrate portion of the surface light source device may be contained in the portion in the rear surface of the liquid crystal panel, which portion is recessed from the lower surface of the polarizer plate in the absence of the polarizer plate, and a liquid crystal display device with a reduced thickness is thus provided.

As has been described above, according to one or more embodiments of the present invention, the light guide plate and the light source may be reliably located, and besides, the thickness of the surface light source device may be reduced. Further, the light use efficiency of the surface light source device is improved.

DETAILED DESCRIPTION

Hereinafter, preferred embodiments of the present invention are described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
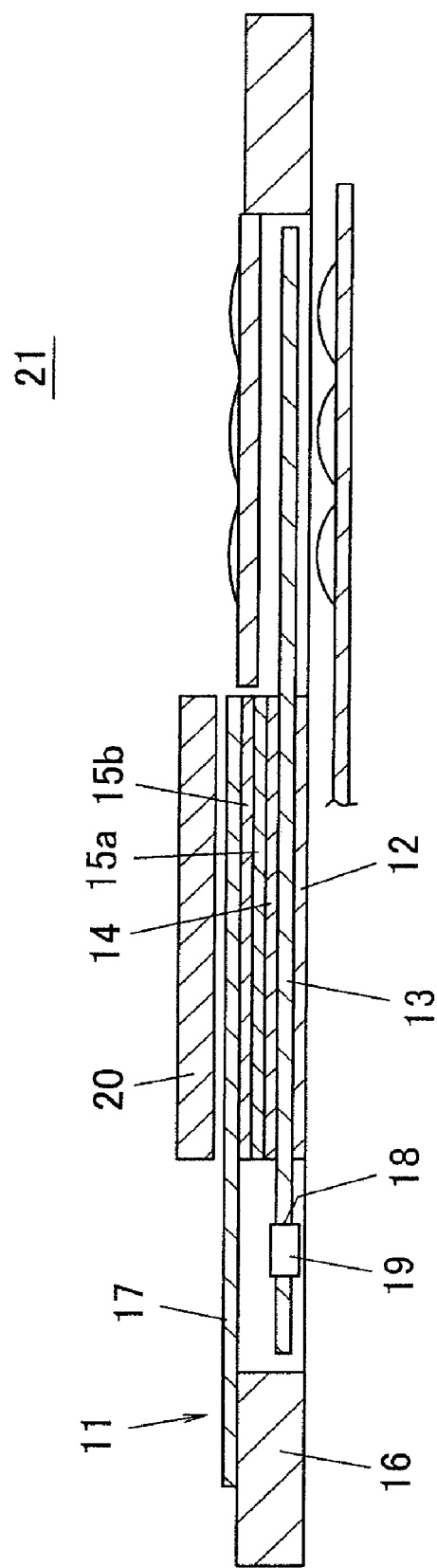
FIG. 1 is a schematic cross-sectional view of the liquid crystal display device disclosed in JP2009-054327A.
Figure 2:
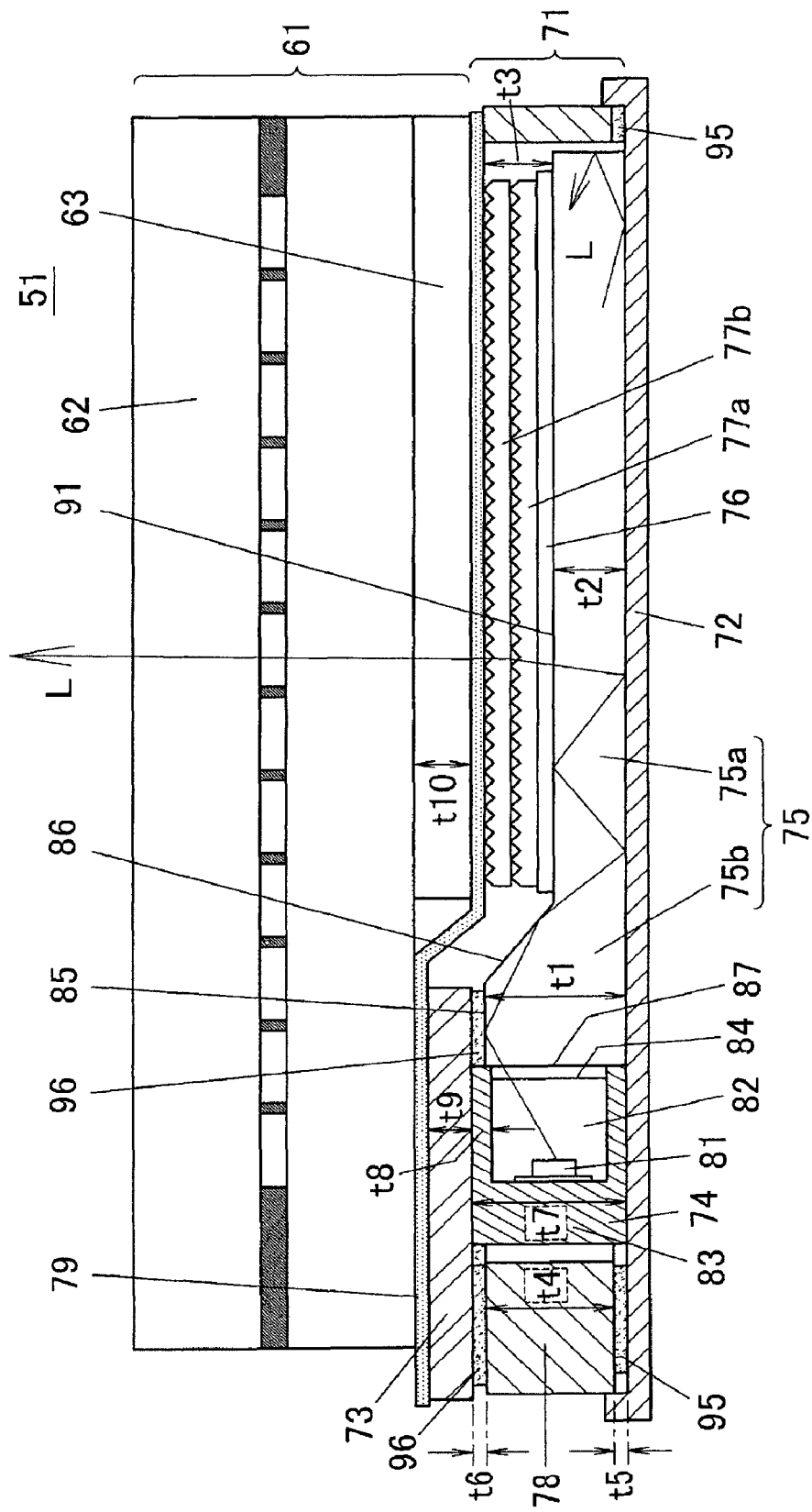
FIG. 2 is a cross-sectional view of a liquid crystal display device according to one embodiment of the present invention.
Figure 3:
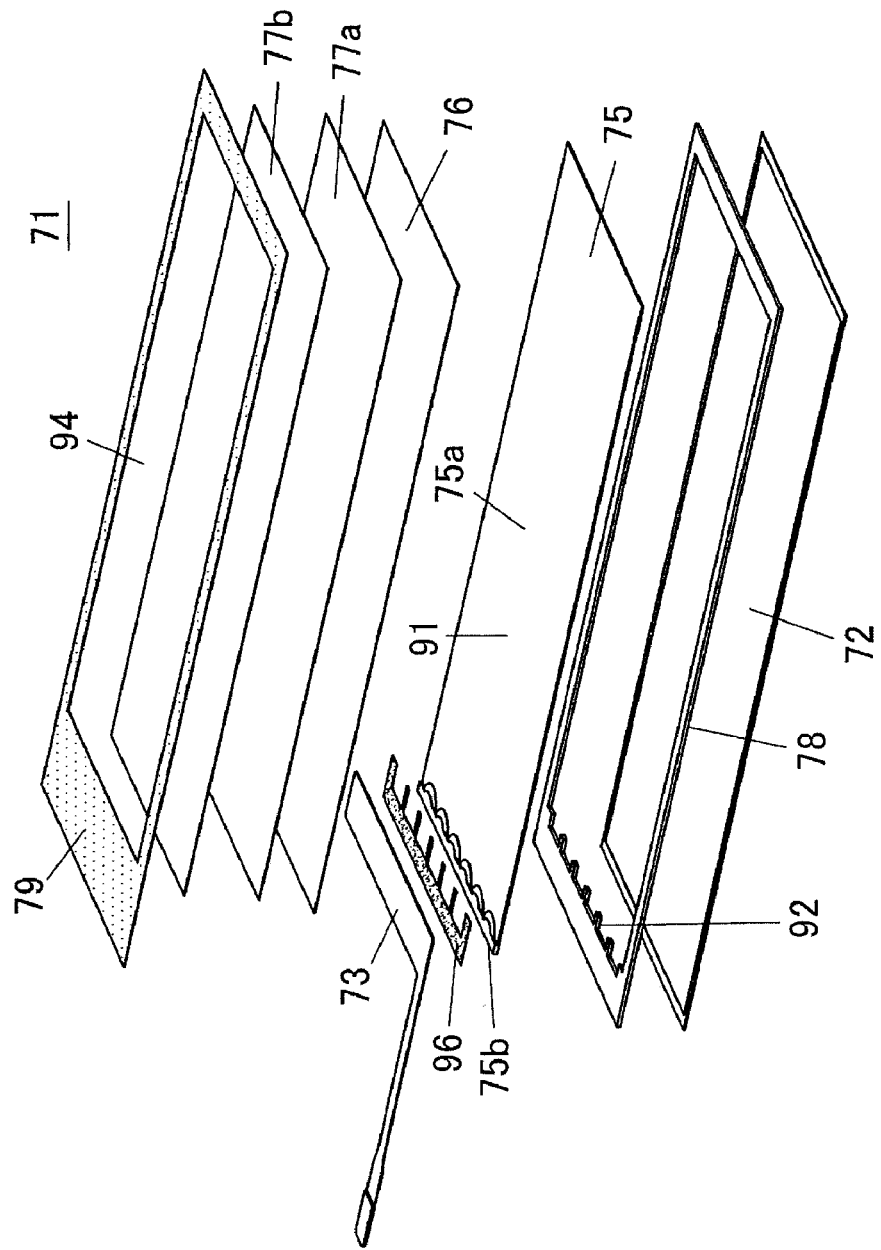
FIG. 3 is an exploded perspective view of a surface light source device for use in the liquid crystal display device.

FIG. 2 is a cross-sectional view of a liquid crystal display device 51 according to one embodiment of the present invention. The liquid crystal display device 51 includes a liquid crystal panel unit 61 and a surface light source device 71 (backlight) of a sidelight type. FIG. 3 is an exploded perspective view of the surface light source device 71. FIGS. 4A to 7 are perspective views illustrating portions of the surface light source device 71. The structures of the surface light source device 71 and of the liquid crystal display device 51 are described below with reference to FIGS. 2 to 7.

As shown in FIGS. 2 and 3, the surface light source device 71 mainly includes a reflector plate 72, light sources 74 mounted on a wiring substrate 73, a light guide plate 75, a diffuser plate 76 (an optical sheet), two prism sheets 77a and 77b (optical sheets), a frame 78 (a frame-like member), and a rim sheet 79 (a light shielding member).

The reflector plate 72 is a thin sheet with a highly reflective surface that is formed from a reflector sheet having a multi-layer film structure, a white PET reflector sheet (porous PET), or a reflector sheet with its resinous sheet surface deposited with silver or aluminum. Exemplary reflector plates include an enhanced specular reflector (ESR) (of 65 µm thick) available from Sumitomo 3M Ltd. The reflector plate 72 illustrated has a slightly greater thickness at its periphery for the locating of the frame 78 upon placement of the frame 78 on the upper surface of the reflector plate. Instead, the reflector plate 72 may have a uniform thickness.

Figure 4A:
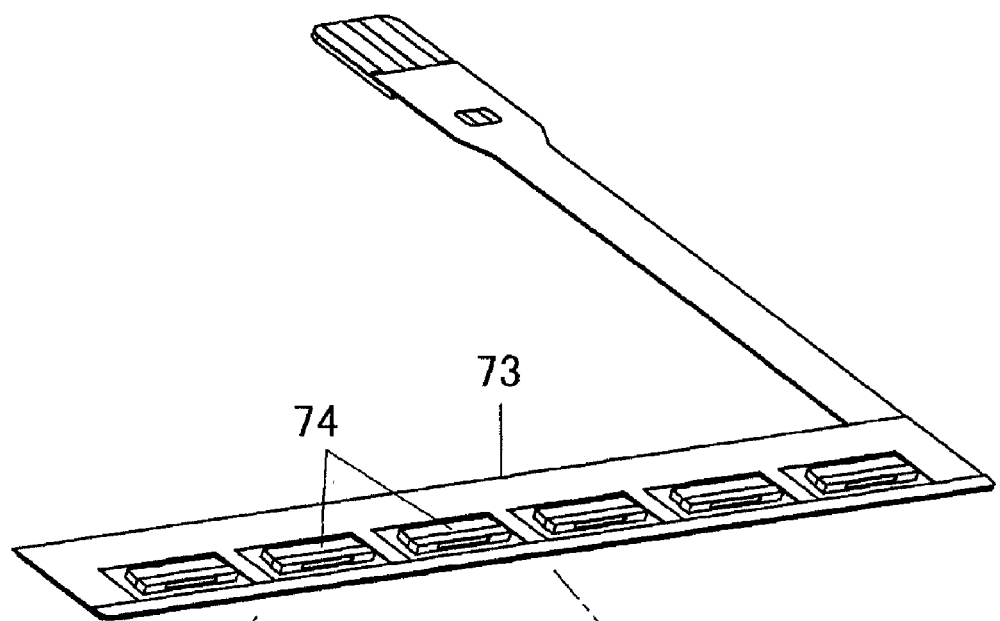
FIG. 4A is a perspective view illustrating the rear surface of a wiring substrate mounted with a plurality of light sources.
Figure 4B:
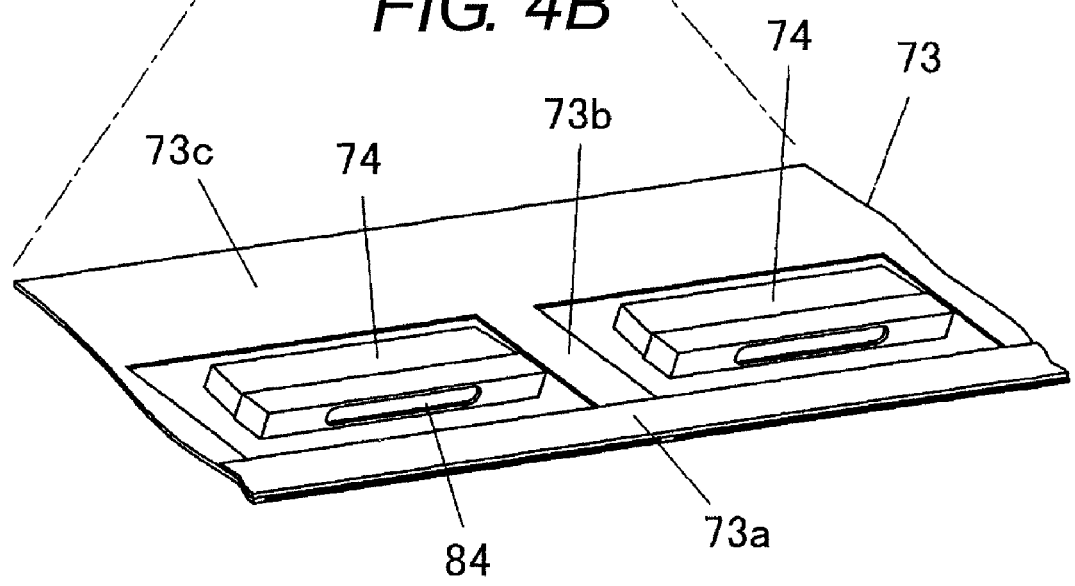
FIG. 4B is a perspective view illustrating a portion of FIG. 4A in an enlarged manner.

The wiring substrate 73 is a bendable flexible printed board (e.g., of 100 μm thick) having a lower surface provided with mounting portions for mounting a plurality of light sources 74 at predetermined intervals. FIGS. 4A and 4B are perspective views illustrating the rear surface side of the wiring substrate 73. The light sources 74 are aligned linearly with their light outgoing windows 84 oriented in the same direction. Of the lower surface of the wiring substrate 73, the area to be adhesively applied to the upper surface of the frame 78 comprises areas 73b between the light sources 74 and an area 73c along the backs of the light sources 74. The area to be adhesively applied to the upper surface of the light guide plate 75 comprises an area 73a extending frontward from the inter-light source 74 areas 73b of the lower surface of the wiring substrate 73.

As shown in FIG. 2, the light sources 74 (sometimes referred to as point light sources) individually contain blue light emitting diode elements 81 that are mounted in packages 83 and are further sealed in phosphor resin 82, so as to provide white light emission. Exemplary light sources 74 may include NSSW204 (of 400 μm high) available from Nichia Corporation. The front side of the phosphor resin 82 is exposed from the packages 83 to serve as the light outgoing windows 84. The light emitted from the blue light emitting diode elements 81 is converted into pseudo-white light by the phosphor resin 82 and is then emitted frontward from the light outgoing windows 84.

The light guide plate 75 is formed from a resin with a high index of refraction and translucency, such as polycarbonate resin, polymethylmethacrylate (PMMA), or acrylic resin. The light guide plate 75 includes a light guide plate main body 75a and a light introducing portion 75b. The light introducing portion 75b is provided at an end of the light guide plate main body 75a continuously from the light guide main body 75a. A light outgoing area 91 is defined in the light guide plate main body 75a over the entire upper surface thereof or at a portion of the upper surface. A diffusion-treated portion (not shown) is defined, opposite the light outgoing area 91, in the lower surface of the light guide plate main body 75a. The diffusion-treated portion is provided in the form of triangular prismatic, minute patterns formed on the lower surface of the light guide plate main body 75a, recessed and raised minute patterns in a circular shape as viewed from the upper surface of the plate, or diffusingly reflective ink printed in minute dot patterns. The patterns or dots increase in density as the distance from the light introducing portion 75b becomes greater.

The light introducing portion 75b has an upper surface side raised higher than the upper surface of the light guide plate main body 75a. Because of this structure, the light introducing portion 75b has a greater thickness (maximum thickness) than the light guide plate main body 75a. The light introducing portion 75b has, e.g., a maximum thickness of 375 μm, and the light guide plate main body 75a has a maximum thickness of 150 μm. The entire lower surface of the light guide plate 75 is flat.

Figure 5:
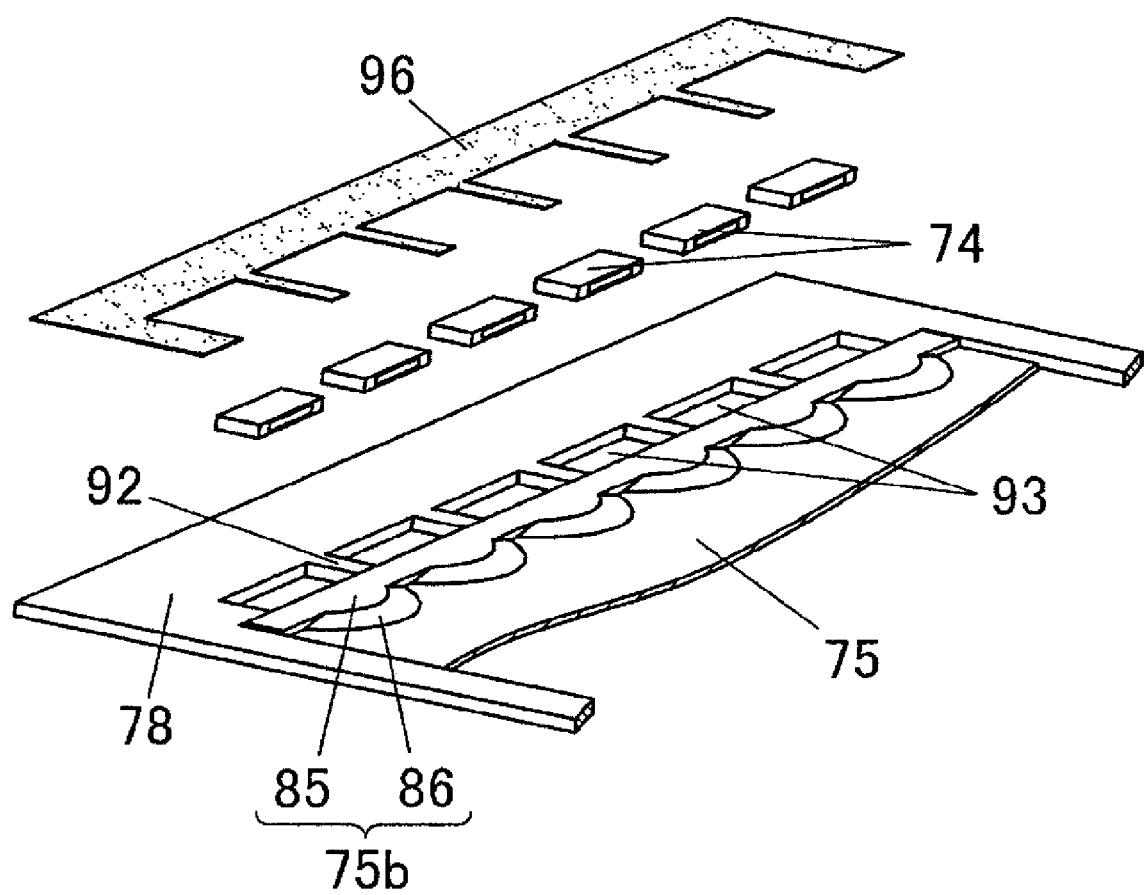
FIG. 5 is a fragmentary perspective view illustrating a light guide plate set within a frame, light sources, and a wiring substrate double-sided adhesive tape.

As shown in FIGS. 2 and 5, the upper surface of the light introducing portion 75b includes a flat surface 85 (the upper surface at the maximum thickness area) and a plurality of slant surfaces 86. The light sources 74 are arranged such that the light outgoing windows 84 thereof are opposed to the endface of the light introducing portion 75b. The slant surfaces 86 in a circular arc shape are disposed at positions opposite the light sources 74. The slant surfaces 86 are disposed so as not to overlap each other. The slant surfaces 86 slant downward from the flat surface 85 toward the edge of the light guide plate main body 75a, such that the slant surfaces form ring belt areas in a circular arc shape around the radiative centers or points in the vicinity of the radiative centers of the light sources 74 as seen in a direction perpendicular to the light guide plate 75. For example, the shape of the slant surfaces 86 is partly formed of a cone having its apex at a point immediately above the radiative center or a point in the vicinity of the radiative center of a light source 74. The light guide plate 75 has in the endface of its light introducing portion 75b light incident surfaces 87 at positions opposite the light sources 74.

In the light guide plate 75, the light introducing portion 75b has a thickness that is greater than the thickness of the light guide plate main body 75a and is approximately equal to the height of the light sources 74. The light to proceed off the light guide plate 75 is thus reduced. Accordingly, the light emitted from the light sources 74 is captured efficiently by the light incidence surfaces 87 to be taken into the light introducing portion 75b, and the light from the light sources 74 is even more efficiently introduced into the light introducing portion 75b.

Although the thickness of the light guide plate main body 75a is smaller, the slant surfaces 86 link the flat surface 85 to the upper surface of the light guide plate main body 75a. The light to leak out at the transitional portion from the light introducing portion 75b to the light guide plate main body 75a is thus reduced in quantity. More specifically, as shown in FIG. 2, the light L advancing into the light introducing portion 75b is totally reflected by the slant surfaces 86, thereby being guided into the light guide plate main body 75a, which means the light L that has entered the light introducing portion 75b is guided to the light guide plate main body 75a with a little loss. The light L guided to the light guide plate main body 75a is reflected by the diffusion-treated portion of the light guide plate 75 and is released from the entirety of the light outgoing area 91.

The light use efficiency is improved with the use of such a light guide plate 75, so that the light outgoing area 91 becomes brighter.

Since the thickness of the light guide plate main body 75a is reduced, the surface light source device 71 can be made thin by stacking the diffuser plate 76 and the prism sheets 77a and 77b so as to be contained in the space above the upper surface of the light guide plate main body 75a.

The diffuser plate 76 acts to diffuse the light released from the light outgoing area 91 to a certain degree to spread the directional characteristics of the outgoing light. Exemplary diffuser plates may include D120S (of 95 μm thick) available from Tsujiden Co. Ltd. This is because, in case of using a diffusion-treated portion with triangular prismatic patterns, the outgoing light from the light outgoing area 91 will have narrow directional characteristics, which needs to be compensated for by the use of the diffuser plate 76 in such a manner that the directional characteristics are spread to provide a suitable angle of view when such a diffusion-treated portion is used in the liquid crystal display device 51. Hence, the diffuser plate 76 need not be provided in case of using a diffusion-treated portion in the form of a diffusingly reflective ink.

The prism sheets 77a and 77b have triangular prismatic, minute patterns arranged thereon in parallel to one another to orient the maximum brightness direction of the light transmitted through the diffuser plate 76 into a vertical direction. The prism sheets 77a and 77b are stacked in such a manner that the respective triangular prismatic, minute patterns cross one another (so as to establish mutually a twisted positional relationship). Exemplary prism sheets 77a and 77b may include TBEF2 (of 65 μm thick) available from Sumitomo 3M Ltd.

The frame 78 is formed from a sheet of, e.g., white PET or of SUS punched by, e.g., a press to have a frame-like shape and has a uniform thickness. The frame 78 desirably has higher rigidity than the light guide plate 75. The frame 78 is capable of containing, in its inner peripheral portion, the light guide plate 75 and the plurality of light sources 74. Particularly, an end of the inner peripheral portion of the frame 78 is provided with a comb-like portion 92 in which recesses 93 to receive the light sources 74 are formed. The frame 78 may be, for example, Lumirror S10#350 (of 350 µm thick) available from Toray Industries, Inc., a PET sheet, subjected to punching.

The rim sheet 79 may be implemented by a black double-sided adhesive tape for light shielding, e.g., 7045 (0.05) Black HF (of 50 µm thick) available from Teraoka Seisakusho Co., Ltd. The rim sheet 79 is dimensioned approximately equal to the outer shape of the frame 78 and has an opening 94 that is slightly smaller than the outer shape of the prism sheet 77b.

The members of the surface light source device 71 thus configured are assembled as described below. First, a double-sided adhesive tape 95 (a first adhesive member) is applied at its one side to the lower surface of the frame 78, and the frame 78 is superposed on the upper surface of the reflector plate 72 so that the frame 78 is applied at its lower surface to the upper surface of the reflector plate 72 by means of the double-sided adhesive tape 95. Then, as shown in FIG. 5, the light guide plate 75 is fitted in the inner peripheral portion of the frame 78 to be placed on the upper surface of the reflector plate 72, and the endface of the light guide plate 75 is abutted on the end of the comb-like portion 92 to locate the light guide plate 75.

Figure 6:
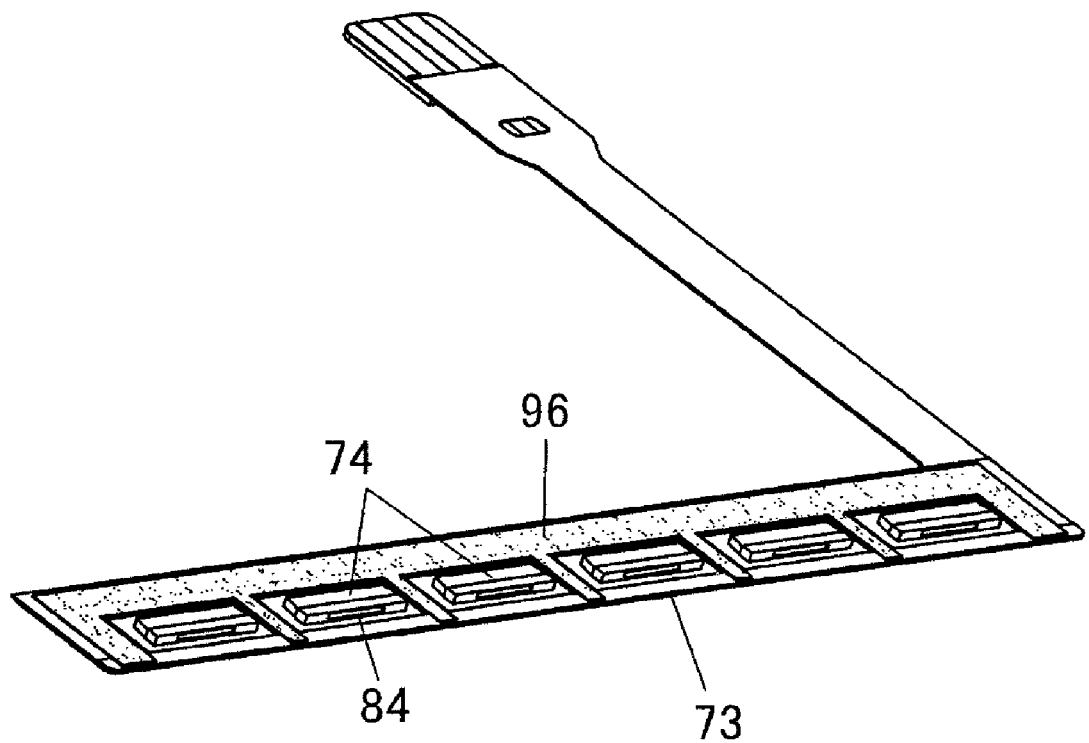
FIG. 6 is a perspective view illustrating the wiring substrate with the wiring substrate double-sided adhesive tape applied at its rear surface.
Figure 7:
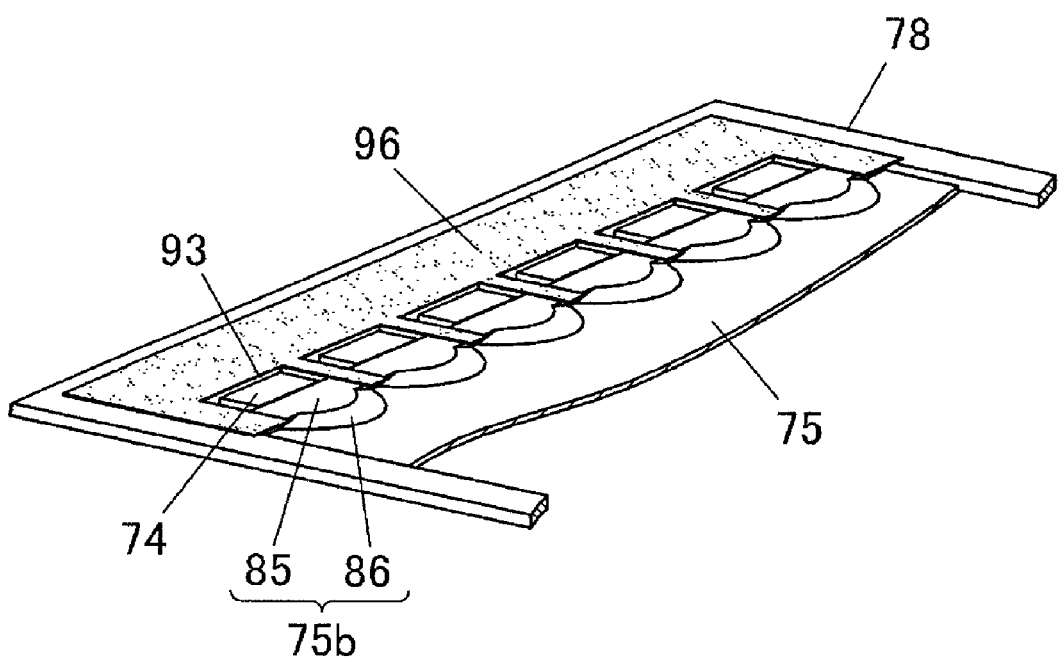
FIG. 7 is a fragmentary perspective view illustrating a state in which the light guide plate and the light sources are set within the frame and the wiring substrate double-sided adhesive tape is applied to the upper surface of the frame (note that the wiring substrate is not shown)

As shown in FIG. 5, a wiring substrate double-sided adhesive tape 96 for application of the wiring substrate 73 has a comb-like shape. As shown in FIG. 6, the wiring substrate double-sided adhesive tape 96 is applied at its one side to the rear surface of the wiring substrate 73 mounted with the plurality of light sources 74. In so doing, the wiring substrate double-sided adhesive tape 96 is applied to the rear surface of the wiring substrate 73 at the areas 73a, 73b, and 73c. Then, as shown in FIG. 7, the light sources 74 are fitted into the recesses 93 in the frame 78 to set the light sources 74 to face the light incidence surfaces 87 of the light introducing portion 75b, while the lower surface of the wiring substrate 73 is brought into adhesion with the upper surfaces of the frame 78 and of the light introducing portion 75b by the use of the wiring substrate double-sided adhesive tape 96. FIG. 7 illustrates the portions to be adhesively attached by the wiring substrate double-sided adhesive tape 96, wherein the wiring substrate 73 is removed for clarity. As seen from FIG. 7, the wiring substrate double-sided adhesive tape 96 is adhesively applied to the flat surface 85 of the light introducing portion 75b except at the front areas of the light sources 74. This is because the adhesive used in the wiring substrate double-sided adhesive tape 96 has a greater index of refraction than the air; in other words, the adhesive application of the wiring substrate double-sided adhesive tape 96 to the flat surface 85 at the front areas of the light sources 74 may cause decrease in the difference in indices of refraction at the flat surface 85, leading to leakage to the outside, hence a loss, of light to be introduced into the light introducing portion 75b for total reflection at the flat surface 85, because of the wiring substrate double-sided adhesive tape 96.

The wiring substrate double-sided adhesive tape 96 may be applied to the upper surfaces of the frame 78 and of the light introducing portion 75b, and thereon may be placed the wiring substrate 73 mounted with the light sources 74 so that the wiring substrate 73 is adhesively applied to the wiring substrate double-sided adhesive tape 96.

As shown in FIG. 2, the diffuser plate 76 and the prism sheets 77a and 77b are, in turn, stacked in order on the upper surface of the light guide plate main body 75a. As the rim sheet 79 is a soft double-sided adhesive sheet, the rim sheet is bent into adhesion with the upper surface of the wiring substrate 73 and the upper surface of the frame 78. The periphery of the opening 94 in the rim sheet 79 is adhesively applied to outer peripheral portion of the upper surface of the prism sheet 77b.

In the surface light source device 71 thus assembled, the light guide plate 75 is held between the reflector plate 72 adhesively applied to the lower surface of the frame 78 and the wiring substrate 73 adhesively applied to the upper surface of the frame 78, and the light guide plate 75 is adhesively applied further to the wiring substrate 73. Thus, the light guide plate 75 is held by the wiring substrate 73 and the reflector plate 72 so as to enable locating of the light guide plate 75 along the thickness of the device for firm fixation thereat. Also, these components are stacked on each other snugly and are sandwiched between the rim sheet 79 that is adhesively applied to the upper surfaces of the wiring substrate 73 and of the frame 78 and the reflector plate 72 that is adhesively applied to the lower surface of the frame 78, thus providing for firm assembly and easy handling.

In order to achieve such a structure, the dimensions of the members may be decided in advance in the following manner: First, as shown in FIG. 2, where the maximum thickness of the light introducing portion 75b is set as t1, the thickness of the frame 78 as t4, and the thickness of the double-sided adhesive tape 95 for adhesively attaching the lower surface of the frame 78 to the reflector plate 72 as t5, a relationship of $$t1 = t4 + t5 \qquad \text{(Relationship 1)}$$

is roughly established. With such a dimensional relationship, it is possible to sandwich the light introducing portion 75b of the light guide plate 75 snugly between the reflector plate 72 and the wiring substrate 73.

The double-sided adhesive tape 95, however, may have a slightly greater thickness. Exemplary double-sided adhesive tapes 95 may include #707 (of 30 µm thick) available from Teraoka Seisakusho Co., Ltd. A slightly greater thickness of the double-sided adhesive tape 95 may be tolerated by being compressed by the wiring substrate 73 along with the associated components so that the relationship 1 is roughly established.

In the surface light source device 71, the light guide plate 75 is sandwiched and held between the wiring substrate 73 (or the rim sheet 79) and the reflector plate 72, and the light guide plate 75 is not fixed at its outer peripheral surface to the frame 78 with a double-sided adhesive tape or an adhesive. The outer peripheral surface of the light guide plate 75 is therefore in contact with the air, and so the difference in indices of refraction does not decrease at the outer peripheral surface of the light guide plate 75 as in the conventional example. Thus, as shown in FIG. 2, the light L that reaches the endface of the light guide plate 75 is totally reflected at the endface of the light guide plate 75, which suppresses the light L from leaking out from the endface. Although the light leaks out more or less from the endface of the light guide plate 75, the light leaking out from the endface of the light guide plate 75 is reflected at the inner peripheral surfaces of the frame 78 of, e.g., white PET or SUS, thereby being returned into the light guide plate 75. Accordingly, the surface light source device 71 is improved in light use efficiency, so that the brightness of the surface light source device 71 is enhanced.

For the light leaked to be reflected by the frame 78 and returned into the light guide plate 75, the use of white PET (porous PET) is highly effective, which provides for enhanced brightness of the surface light source device 71. If a white PET sheet of a desired thickness is not available, pale white PET sheets, including, e.g., E20#250 (of 250 μm thick) and E20#75 (of 75 μm thick) available from Toray Industries, Inc., may be stuck to each other using a double-sided tape on the order of 30 μm thick.

Although the light sources 74 are mounted to the wiring substrate 73 that is adhesively applied to the upper surface of the frame 78 and are thus secured firmly and located precisely, it is more preferred that the following condition is met: As shown in FIG. 2, where the thickness of the frame 78 is set as t4, the thickness of the double-sided adhesive tape 95 for adhesively attaching the lower surface of the frame 78 to the reflector plate 72 as t5, the thickness of the wiring substrate double-sided adhesive tape 96 for adhesively attaching the lower surface of the wiring substrate 73 to the frame 78 as t6, and the height of the light sources measured from the lower surface of the wiring substrate 73 as t7, a relationship of $$t4+t5+t6=t7 \quad \text{(Relationship 2)}$$

is roughly established. With such a dimensional relationship, it is possible to sandwich the light sources 74 snugly between the reflector plate 72 and the wiring substrate 73 for locating and holding thereat.

It is to be noted that the wiring substrate double-sided adhesive tape 96 may have a slightly greater thickness. Exemplary wiring substrate double-sided adhesive tapes 96 may include No. 5603 (of 30 μm thick) available from Nitto Denko Corporation. A slightly greater thickness of the wiring substrate double-sided adhesive tape 96 may be tolerated by being compressed by the wiring substrate 73 along with the associated components so that the relationship 2 is roughly established.

Since the light sources 74 are mounted on the lower surface of the wiring substrate 73 adhesively applied to the upper surface of the light introducing portion 75b, the positional relationship between the light outgoing windows 84 of the light sources 74 and the light incidence surfaces 87 of the light introducing portion 75b is known with satisfactory accuracy. Thus, by setting the distance t8 measured from the lower surface of the wiring substrate 73 to the upper edge of the light outgoing window 84 of a light source 74 to be equal to or larger than the thickness t6 of the wiring substrate double-sided adhesive tape 96 (t8≧t6), the outgoing light from the light outgoing windows 84 is prevented from proceeding off from the light incidence surfaces 87 of the light introducing portion 75b, and the light from the light sources 74 is yet more efficiently introduced into the light guide plate 75.

Next, since in the surface light source device 71, a light introducing portion 75b with a greater thickness is provided at a portion of the light guide plate 75, and the light introducing portion 75b is sandwiched between the reflector plate 72 and the wiring substrate 73. Accordingly, a space for containing the diffuser plate 76 and the prism sheets 77a and 77b may be formed above the light guide plate main body 75a with a smaller thickness, and the surface light source device 71 may be reduced in thickness.

Particularly, as shown in FIG. 2, where the thickness of the light introducing portion 75b is set as t1, the thickness of the light guide plate main body 75a as t2, and the total thickness of the optical sheets as t3, a relationship of $$t1-t2=t3 \quad \text{(Relationship 3)}$$

is roughly established; in this case, the thickness t1 of the light introducing portion 75b may be set to a smallest possible thickness such that the diffuser plate 76 and the prism sheets 77a and 77b do not project from the frame 78. Hence, the surface light source device 71 has a smallest thickness in this case. Further, since the upper surface of the prism sheet 77b comes approximately to the same level as the upper surface of the frame 78, it is possible to apply the rim sheet 79 adhesively to the upper surface of the frame 78 and to the outer peripheral portion of the upper surface of the prism sheet 77b, allowing for fixation of the prism sheet 77b and the associated components.

Note that it may be adapted such that a relationship of $$t1-t2 \geq t3$$

is established instead of the relationship 3. In this case, too, the prism sheet 77b and the associated components do not project upward from the light introducing portion 75b and the frame 78, and there is eliminated a factor hindering thickness reduction of the surface light source device 71, as well as a factor hampering application of the rim sheet 79 to the upper surface of the frame 78.

The liquid crystal panel unit 61 includes the liquid crystal panel 62 and a polarizer plate 63 applied to the rear surface of the liquid crystal panel 62. The polarizer plate 63 is smaller in area than the liquid crystal panel 62, and the rear surface of the liquid crystal panel 62 is partly exposed from the polarizer plate 63. In assembling the liquid crystal display device 51 with the surface light source device 71 applied to the rear surface of the liquid crystal panel unit 61, the polarizer plate 63 is laid on the rim sheet 79 in an upper portion of the light guide plate main body 75a, and the wiring substrate 73 and the rim sheet 79 portion thereon are set in the recessed portion with no polarizer plate 63 situated. With such a structure, the portion with a greater thickness in the surface light source device 71 is allowed to sit in the recessed portion in the rear surface of the liquid crystal panel unit 61, and reduction in thickness of the liquid crystal display device 51 is thereby achieved.

For that purpose, where the thickness of the wiring substrate double-sided adhesive tape 96 for adhesively attaching the lower surface of the wiring substrate 73 to the light introducing portion 75b is set as t6, the thickness of the wiring substrate 73 as t9, and the thickness of the polarizer plate 63 as t10, a relationship of $$t6+t9 \leq t10 \quad \text{(Relationship 4)}$$

is roughly established.

Figure 8A:
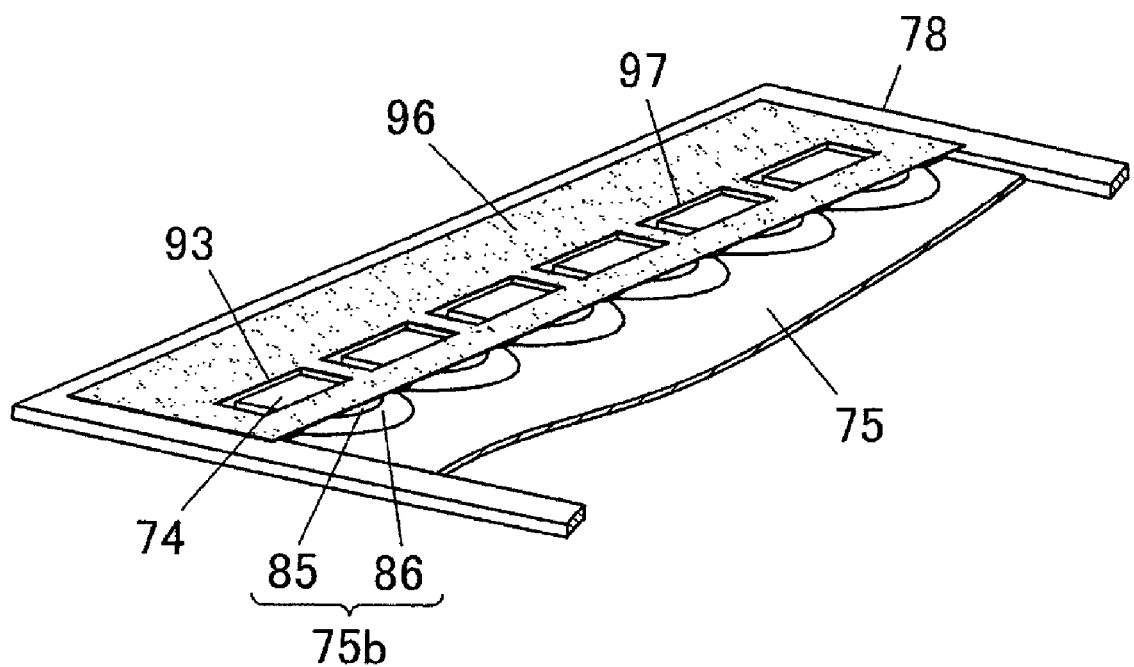
FIG. 8A is a perspective view illustrating a portion of an embodiment using a wiring substrate double-sided adhesive tape in a different shape.
Figure 8B:
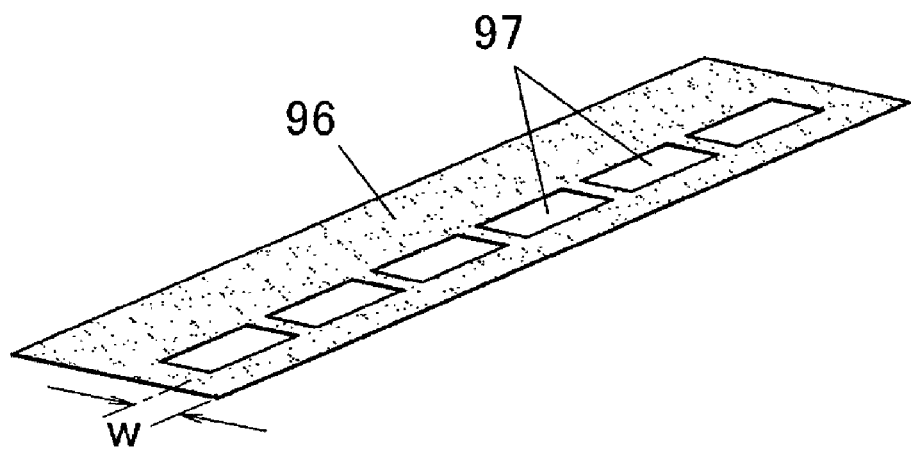
FIG. 8B is a perspective view illustrating the wiring substrate double-sided adhesive tape.

FIGS. 8A and 8B are perspective views illustrating a portion of another embodiment. In this embodiment, the wiring substrate double-sided adhesive tape 96 has a different shape. The wiring substrate double-sided adhesive tape 96 for use in this embodiment is provided with bores 97 for passing the light sources 74 therethrough. Further, the wiring substrate double-sided adhesive tape 96 is adhesively applied to the flat surface 85 not only at the areas between the light sources 74 but also at the front portion of the light sources 74. Accordingly, the areas for adhesive application of the wiring substrate 73 is increased, but the portion of the wiring substrate double-sided adhesive tape 96 to be adhesively applied to the upper surface of the light introducing portion 75b preferably has a smallest possible width w in order to reduce the quantity of light to be leaked.

Figure 9A:
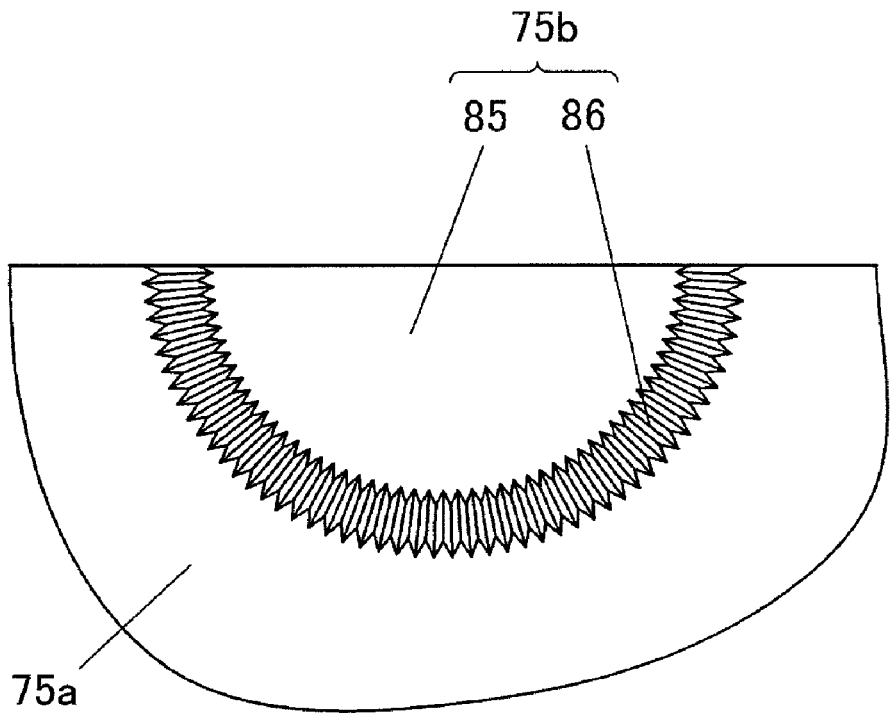
FIG. 9A is a plan view illustrating a light introducing portion with a different structure.
Figure 9B:
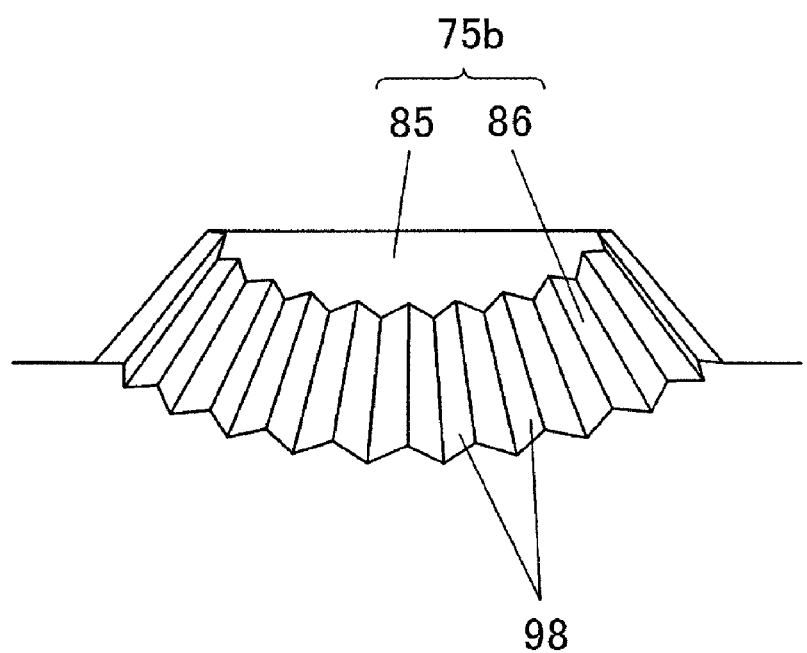
FIG. 9B is a schematic perspective view thereof.

FIGS. 9A and 9B are a plan view and a perspective view illustrating a portion of still another embodiment (a portion of the light introducing portion 75b). In this embodiment, a plurality of V-shaped grooves 98 are formed on the slant surfaces 86 of the light introducing portion 75b. As shown in FIG. 9A, the V-shaped grooves 98 are provided so as to radiate from the radiative centers of the light sources 74 or from points in the vicinity of the radiative centers in planar view.

Flat and smooth slant surfaces 86 as illustrated in the first embodiment are likely to let light out in case where the slant surfaces 86 are inclined at an appreciable angle. The slant surfaces 86 having a small angle of inclination makes for increase in area of the light introducing portion 75b, and the proportion of the light guide plate main body 75a is decreased by the increased area of the light introducing portion, hence inviting lowering in use efficiency of the light guide plate 75.

On the other hand, with the V-shaped grooves 98 formed on the slant surfaces 86, the leakage of light from the slant surfaces 86 is suppressed even in case of the slant surfaces 86 at an appreciable angle of inclination. The action of the light introducing portion 75b having the slant surfaces 86 provided with the V-shaped grooves 98 is described in Japanese Patent Application No. 2007-155797 or PCT/JP2008/60610 (an international application), and the details thereof is not given here. Other forms of light introducing portions as described in Japanese Patent Application No. 2007-155797 or PCT/JP2008/60610 may also be used for the light introducing portion 75b of the present invention.

The present invention is not limited to the foregoing embodiments, and various changes and modifications may be made in the design without departing from the scope of the present invention. For example, while a plurality of light sources are used in the above embodiments, a single light source may be used. Such a light source may be received in a bore formed in the light introducing portion 75b so as to face a light incidence surface that is situated at the inner surface of the bore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A surface light source device comprising:
   a reflector plate;
   a light guide plate placed on an upper surface of the reflector plate, the light guide plate including
      a light guide plate main body having a light outgoing area, and
      a light introducing portion provided continuously from an end of the light guide plate main body, the light introducing portion having an upper surface side projected from an upper surface of the light guide plate main body in such a manner as to have a maximum thickness greater than a thickness of the light guide plate main body;
   a light source disposed such that light emitted therefrom is introduced into the light guide plate from a light incidence surface of the light introducing portion;
   a frame-like member having a uniform thickness, the frame-like member being adhesively applied to the upper surface of the reflector plate in such a manner as to enclose the light guide plate and the light source;
   a wiring substrate mounted at a lower surface thereof with the light source, the wiring substrate being adhesively applied to an upper surface of the frame-like member and to the upper surface of the maximum thickness area of the light introducing portion; and
   at least one optical sheet disposed on the upper surface of the light guide plate main body, the light introducing portion being sandwiched between the wiring substrate adhesively applied to the upper surface of the frame-like member and the reflector plate adhesively applied to the lower surface of the frame-like member.

2. The surface light source device according to claim 1, wherein the combined thicknesses of a first adhesive member and of the frame-like member is approximately equal to the maximum thickness of the light introducing portion, the first adhesive member adhesively attaching a lower surface of the frame-like member to the upper surface of the reflector plate.

3. The surface light source device according to claim 2, wherein
   the wiring substrate is disposed at such a position that the wiring substrate does not overlie the light outgoing area of the light guide plate main body and the optical sheet,
   the thickness of the light guide plate and the total thickness of the optical sheet are such that:

$t1-t2 \geq t3$, where t1 is the maximum thickness of the light introducing portion, t2 is the thickness of the light guide plate main body, and t3 is the total thickness of the optical sheet, and
   a light shielding member is adhesively applied to an upper surface of the wiring substrate and to the upper surface of the frame-like member at an area exposed from the wiring substrate, such that a height difference is formed therebetween.

4. The surface light source device according to claim 2, wherein
   the light incidence surface of the light introducing portion extends for a height approximately equal to the maximum thickness of the light introducing portion, and
   the third adhesive member adhesively attaching the lower surface of the wiring substrate to the upper surface of the maximum thickness area of the light introducing portion has a thickness approximately equal to or smaller than the distance from the lower surface of the wiring substrate to an upper edge of a light outgoing window of the light source.

5. A liquid crystal display device comprising a liquid crystal panel unit placed on an upper surface of the surface light source device of claim 2.

6. The surface light source device according to claim 2, wherein the combined thicknesses of the first adhesive member, of a second adhesive member, and of the frame-like member are approximately equal to the height of the light source measured from a lower surface of the wiring substrate, the first adhesive member adhesively attaching the lower surface of the frame-like member to the upper surface of the reflector plate, the second adhesive member adhesively attaching the lower surface of the wiring substrate to the upper surface of the frame-like member.

7. The surface light source device according to claim 6, wherein
   the wiring substrate is disposed at such a position that the wiring substrate does not overlie the light outgoing area of the light guide plate main body and the optical sheet,
   the thickness of the light guide plate the total thickness of the optical sheet are such that:

$t1-t2 \geq t3$, where t1 is the maximum thickness of the light introducing portion, t2 is the thickness of the light guide plate main body, and t3 is the total thickness of the optical sheet, and
   a light shielding member is adhesively applied to an upper surface of the wiring substrate and to the upper surface of the frame-like member at an area exposed from the wiring substrate, such that a height difference is formed therebetween.

8. The surface light source device according to claim 6, wherein
the light incidence surface of the light introducing portion extends for a height approximately equal to the maximum thickness of the light introducing portion, and
the third adhesive member adhesively attaching the lower surface of the wiring substrate to the upper surface of the maximum thickness area of the light introducing portion has a thickness approximately equal to or smaller than the distance from the lower surface of the wiring substrate to an upper edge of a light outgoing window of the light source.

9. A liquid crystal display device comprising a liquid crystal panel unit placed on an upper surface of the surface light source device of claim 6.

10. The surface light source device according to claim 1, wherein
the wiring substrate is disposed at such a position that the wiring substrate does not overlie the light outgoing area of the light guide plate main body and the optical sheet,
the thickness of the light guide plate and the total thickness of the optical sheet are such that:

$t1-t2 \geq t3$, where t1 is the maximum thickness of the light introducing portion, t2 is the thickness of the light guide plate main body, and t3 is the total thickness of the optical sheet, and
a light shielding member is adhesively applied to an upper surface of the wiring substrate and to the upper surface of the frame-like member at an area exposed from the wiring substrate, such that a height difference is formed therebetween.

11. The surface light source device according to claim 10, wherein
the thickness of the light guide plate and the total thickness of the optical sheet are such that:

$t1-t2=t3$, where t1 is the maximum thickness of the light introducing portion, t2 is the thickness of the light guide plate main body, and t3 is the total thickness of the optical sheet, and
the light shielding member is adhesively applied to an upper surface of an outer peripheral portion of the optical sheet.

12. The surface light source device according to claim 11, wherein the combined thicknesses of the third adhesive member and of the wiring substrate are approximately equal to or smaller than the thickness of the polarizer plate, the third adhesive member adhesively attaching the lower surface of the wiring substrate to the upper surface of the maximum thickness area of the light introducing portion, the polarizer plate being applied to a rear surface of a liquid crystal panel.

13. A liquid crystal display device comprising
a liquid crystal panel unit placed on an upper surface of the surface light source device of claim 12, the liquid crystal panel unit including a liquid crystal panel and a polarizer plate applied to a rear surface of the liquid crystal panel,
wherein the polarizer plate is applied to a portion of the rear surface of the liquid crystal panel, the portion of the surface light source device where the wiring substrate is disposed being situated in an area of the rear surface of the liquid crystal panel where the polarizer plate is not present, an upper surface of the wiring substrate being situated above a lower surface of the polarizer plate.

14. The surface light source device according to claim 10, wherein the combined thicknesses of a third adhesive member and of the wiring substrate are approximately equal to or smaller than the thickness of a polarizer plate, the third adhesive member adhesively attaching the lower surface of the wiring substrate to the upper surface of the maximum thickness area of the light introducing portion, the polarizer plate being applied to a rear surface of a liquid crystal panel.

15. A liquid crystal display device comprising:
a liquid crystal panel unit placed on an upper surface of the surface light source device of claim 14, the liquid crystal panel unit including a liquid crystal panel and a polarizer plate applied to a rear surface of the liquid crystal panel,
wherein the polarizer plate is applied to a portion of the rear surface of the liquid crystal panel, the portion of the surface light source device where the wiring substrate is disposed being situated in an area of the rear surface of the liquid crystal panel where the polarizer plate is not present, an upper surface of the wiring substrate being situated above a lower surface of the polarizer plate.

16. The surface light source device according to claim 1, wherein
the light incidence surface of the light introducing portion extends for a height approximately equal to the maximum thickness of the light introducing portion, and
the third adhesive member adhesively attaching the lower surface of the wiring substrate to the upper surface of the maximum thickness area of the light introducing portion has a thickness approximately equal to or smaller than the distance from the lower surface of the wiring substrate to an upper edge of a light outgoing window of the light source.

17. A liquid crystal display device comprising a liquid crystal panel unit placed on an upper surface of the surface light source device of claim 1.

* * * * *